(12) United States Patent
Choi et al.

(10) Patent No.: US 7,583,953 B2
(45) Date of Patent: Sep. 1, 2009

(54) METHOD AND DEVICE FOR SUBDIVIDING DATA SERVICE CHARGES IN A NETWORK

(75) Inventors: Woo-Hyung Choi, Goyang-si (KR); Mi-Na Oh, Seoul (KR); Sung-Chul Kim, Goyang-si (KR); Sung-Il Jin, Seoul (KR)

(73) Assignee: KT Corporation, Seongnam-si (KR)

( * ) Notice: Subject to any disclaimer, the term of this patent is extended or adjusted under 35 U.S.C. 154(b) by 0 days.

(21) Appl. No.: 11/200,997

(22) Filed: Aug. 10, 2005

(65) Prior Publication Data

US 2006/0052083 A1    Mar. 9, 2006

Related U.S. Application Data

(63) Continuation of application No. PCT/KR2004/000270, filed on Feb. 11, 2004.

(51) Int. Cl.
*H04M 11/00* (2006.01)
(52) U.S. Cl. .................. 455/405; 455/406; 455/408
(58) Field of Classification Search .................. None
See application file for complete search history.

(56) References Cited

U.S. PATENT DOCUMENTS

| | | | |
|---|---|---|---|
| 6,343,284 B1* | 1/2002 | Ishikawa et al. | 705/67 |
| 2002/0068592 A1* | 6/2002 | Hutcheson et al. | 455/501 |
| 2002/0099848 A1 | 7/2002 | Lee | |
| 2002/0167909 A1* | 11/2002 | Balazinski et al. | 370/252 |
| 2002/0176382 A1 | 11/2002 | Madour et al. | |
| 2004/0048600 A1* | 3/2004 | Madour et al. | 455/408 |
| 2004/0102182 A1* | 5/2004 | Reith et al. | 455/410 |
| 2004/0117304 A1* | 6/2004 | Kastelewicz et al. | 705/40 |
| 2005/0003798 A1* | 1/2005 | Jones et al. | 455/410 |

FOREIGN PATENT DOCUMENTS

| | | |
|---|---|---|
| EP | 1 199 852 A | 4/2002 |
| GB | 2 366 684 A | 3/2002 |
| JP | 2000-78129 | 3/2000 |

(Continued)

OTHER PUBLICATIONS

European Search Report dated Oct. 10, 2008 by European Patent Office.

*Primary Examiner*—Erika A Gary
(74) *Attorney, Agent, or Firm*—Knobbe Martens Olson & Bear LLP (57) ABSTRACT

A device and a method of subdividing data service charge in mobile communication network is disclosed. In one embodiment, the method includes receiving a billing initiation request signal from a wireless data service device (either an interworking function (IWF) unit or a packet data serving node (PDSN)), producing a usage-amount data for the subscriber based on at least one of the type and amount of data being transmitted through the wireless data service device on the mobile communication network. The method also includes, responsive to a billing end request signal, received from the wireless data service device, transferring a billing request signal, requesting to bill the subscriber for the usage-amount data, to an authentication, authorization and accounting (AAA) unit. In one embodiment, the above method can apply to a graduated billing for the each service group in the mobile communication network.

21 Claims, 7 Drawing Sheets

FOREIGN PATENT DOCUMENTS

| | | |
|---|---|---|
| KR | 2002-0039974 | 5/2002 |
| KR | 2002-0044201 | 6/2002 |
| KR | 2002-0085155 | 11/2002 |
| KR | 2002-0087282 | 11/2002 |
| WO | WO 02/093835 A1 | 11/2002 |

* cited by examiner

METHOD AND DEVICE FOR SUBDIVIDING DATA SERVICE CHARGES IN A NETWORK

RELATED APPLICATIONS

This application is a continuation application, and claims the benefit under 35 U.S.C. §§ 120 and 365 of PCT Application No. PCT/KR2004/000270, filed on Feb. 11, 2004 and published on Oct. 7, 2004, in English, which is hereby incorporated by reference.

BACKGROUND OF THE INVENTION

1. Field of the Invention

The present invention relates to a method and device for subdividing data service charges in a mobile communication network, and more particularly, for graduated billing according to each service group in the mobile communication network.

2. Description of the Related Technology

Today, many people use the Internet via mobile terminals. Thus, there is no restricted location for accessing the Internet.

Also, data access technology in the mobile communication network, e.g., wireless data service network, has rapidly developed from a circuit-switch network using Interworking Function (IWF) to a packet-switch network using Packet Data Serving Node (PDSN) and Gateway GPRS Serving Node (GGSN). In conjunction with this technological development, the basis for data service charges is moving from time-based billing to packet-based billing.

However, there is a limit in the conventional billing system for handling data services. A graduated schedule cannot be applied to data services for various service groups that are being developed.

SUMMARY OF CERTAIN INVENTIVE ASPECTS

One aspect of the present invention provides a method and system for subdividing data service charges in the mobile communication network, which makes it possible to apply graduated service charge schedules to each service group.

Another aspect of the present invention provides a method and system for subdividing data service charges in the mobile communication network, which functions at a network node, and rather than generating a call detail record (CDR) for a graduated billing, it simply captures and analyzes all packets in the mobile communication network.

DETAILED DESCRIPTION OF CERTAIN INVENTIVE EMBODIMENTS

Hereinafter, embodiments of the present invention will be described with accompanying drawings.

Figure 1:
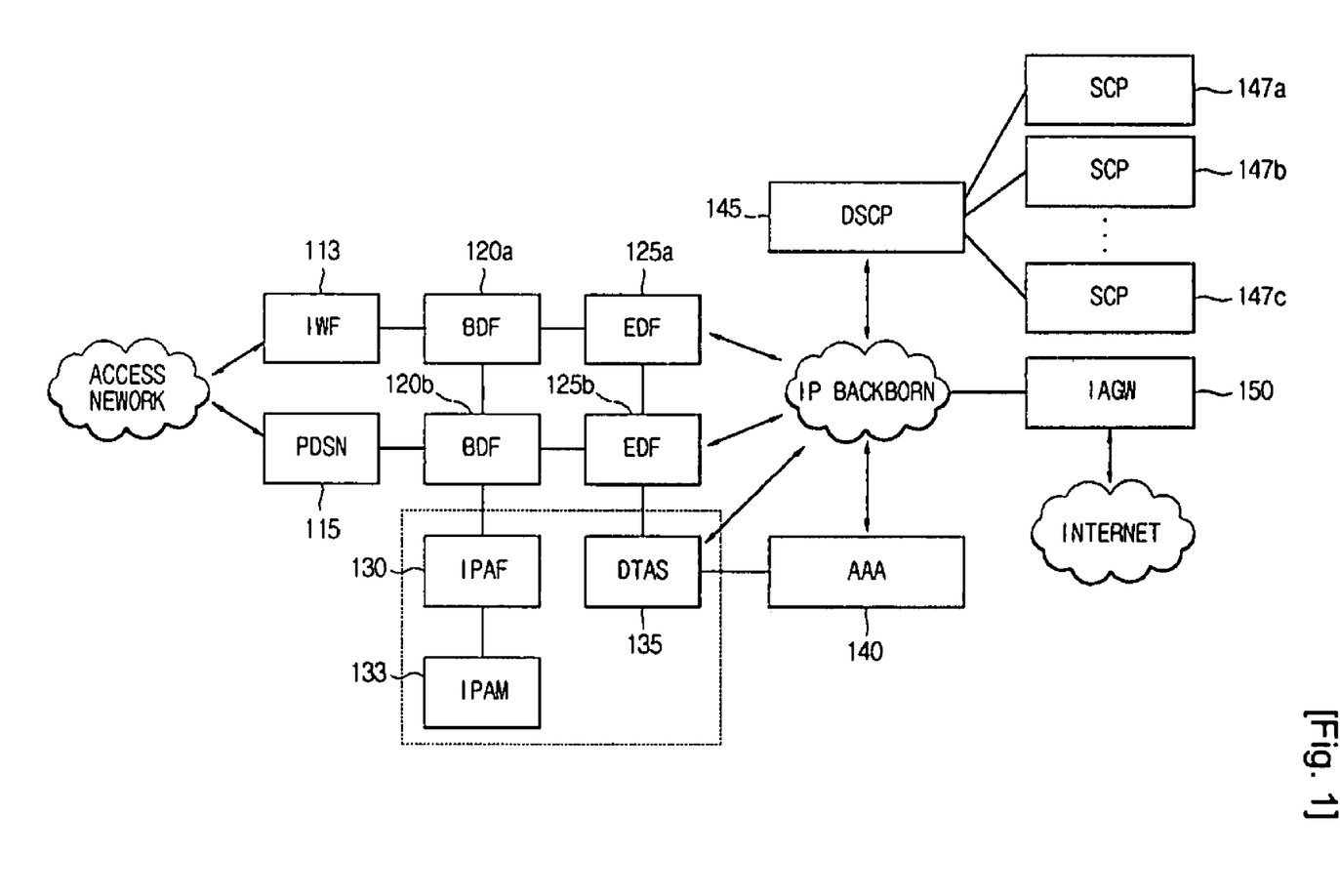
FIG. 1 shows a system for a method of subdividing data service charges in the mobile communication network according to one embodiment of the present invention.

FIG. 1 shows a system for a method of subdividing data service charges in the mobile communication network according to one embodiment of the present invention.

Referring to FIG. 1, the system for subdividing data service charge comprises InterWorking function(IWF)113, packet data serving node(PDSN)115, the first data traffic transferring devices(billing distribution function, BDF) 120a, 120b, the second data traffic transferring devices(Ethernet distribution function, EDF) 125a, 125b, the dedicated accounting device(internet protocol accounting system, IPAS) 127, authentication, authorization and accounting(AAA) 140, data service control point(DSCP) 145, SCP 147a, 147b, ..., 147n, and internet access gateway(IAGW) 150. IWF 113 for 2G services establishes a PPP connection to a subscriber terminal and No7/ISUP connection to PCX.

PDSN 115 works as a R-P interface with PCF(Packet Control Function), PPP interface with the subscriber terminal, and a mobile IP interface with HA(Home Agent). BDF 120a, 120b (hereinafter, "120") duplicates and transfers data traffic of IWF 113 and/or PDSN 115 to an accounting device (IPAF) 130, which is included within IPAS 127. In this case, BDF 120 duplicates Tx/Rx data traffic of one transmission link respectively and bypasses the data traffic on the transmission link without packet loss. BDF 120 has at least two ports, which ports must be separated into Tx port and Rx port, for outputting the duplicated data traffic.

Also, BDF 120 has a data transferring function and a trouble shooting function as well as the data duplicating function. The data transferring function of BDF 120 can transfer the data traffic to an accounting managing device(IPAM) 133 without loss under the full rate circumstance, and the delay due to the duplication of transmission link is maintained below 20 ns. The trouble shooting function of BDF 120 maintains the transmission link to normally operate even if the data duplicating function does not work due to the power failure, and provides a reset function. EDF 125a, 125b (hereinafter "125") duplicates and transfers the data traffic of IWF 113 and/or PDSN 115 to DTAS 135 of IPAS 127. DTAS 135 can also exist independently from IPAS 127.

IPAS 127 is the dedicated accounting device for collecting and analyzing data being transferred between IWF 113/PDSN 115 and IP Backbone network based and performs accounting processes according to the given rule. In more detail, IPAS 127 charges for all data calls generated on the data network and performs the graduated billing function for the usage of various data services and a call controlling function. IPAS 127 comprises IPAF 130, IPAM 133 and DTAS 135. IPAF 130 analyzes the data traffic that is transferred from BDF 120 to collect and charge data on the basis of rules being defined to each subscriber session. In examining the functions of IPAF 130 in detail, there are plural functions in IPAF 130: a cooperating system managing function, a duplex managing function, a time synchronizing function, a rule-managing-by-service function, a data-collecting-by-services function, a data-accounting-by-service function, a session-managing function, a session-data-searching function, a session-monitoring function, and a system process data recording function.

In examining each function briefly, the cooperating system managing function manages connections with all cooperating systems in IP(ICMP) layer and application layer and, if a connection failure occurs, automatically switches to the duplexed system. So, each port of the connected BDF 120 and the defined IPAM 133 can be managed. The duplex managing function can enable IPAF 130, which is duplex-configured in the view of hardware and software, to determine active/standby configuration for each session in cooperation with IPAM 133. Each active/standby system can determine active/standby state through a mutual state test, and both active/standby systems receive the data traffic from BDF 120 and transfer wireless data service usage-amount data(hereinafter, abbreviated "usage-amount data") to IPAM 133 at the time of session end.

The time synchronizing function sets up a reference time by using NTP(Network Time Protocol) and enables application programs to operate based on the reference time. This function manages the states of NTP daemons of each registered NTP server and sets up the state management cycle and the number of transmission of state management message.

The rule-managing-by-services function enables a network operator to define and manage each service group, and enables each service group to be dynamically defined and managed by a cooperating message process with IPAM 133. This function provides latest updates to the application program in real time if a change occurs in the definition of service groups, and makes each service group to be distinguishable by IP addresses and so on.

The data-collecting-by-services function collects data by the defined services and collects data in each session by the service groups that can be distinguished by destination IP addresses. Since the network interface for duplex processing in IPAF 130 and signal processing with cooperating systems is separated from the cooperation with BDF 120, these functions do not affect the data-collecting-by-services function of IPAF 130. And, the data-collecting-by-services function can analyze VPN(Virtual Private Network) services, CDA(Contents Delivery Acceleration) services or IAGW cooperating services, and calculate the amount of usage. Also, this function can collect selectively usage-amount data relevant to specific IP pool by managing IP pool of cooperating PDSN or IWF. The data-accounting-by-services function establishes a session and starts to account on receiving ACCOUNTING START message from IPAM 133, and releases the session and transfers usage-amount data, which is collected by defined service groups, to IPAM 133 on receiving ACCOUNTING STOP message from IPAM 133. This function can transfer usage-amount-by-services data to IPAM 133 in the defined interim cycle and record zero(0) for usage-amount data of service group to be filtered out in usage-amount-by-services data, but actual usage-amount data relevant to the service group to be filtered out must be recorded and stored separately.

The session-monitoring function forms a session on receiving ACCOUNTING START message, namely, session start data from IPAM 133 and deletes session on receiving ACCOUNTING STOP message, namely, session end data from IPAM 133. This function enables to form a temporary session and collect data by extracting session data from collected data even if the session is not defined yet in IPAF 130. And when the session is temporarily formed by collected data, this function can delete the session and record the result if IPAM 133 does not transfer session start data for a given time. In addition, this function can form and manage a session according to the subscriber number or IP address, define the session according to other detail conditions, and charge each defined session.

The session-data-searching function searches session data by conditions(e.g., subscriber number, source IP address, destination IP address, service group, use time, usage, etc) according to the external system cooperation and demand of the network operator, and reports the search result. This function produces the number of registered sessions and related data by conditions. The session-monitoring function registers monitoring targets by conditions(e.g., subscriber number, source IP address, destination IP address, service group, use time, usage, etc) according to the external system cooperation and demand of the network operator. In addition, if the monitoring target is registered, the session-monitoring function transfers a monitoring report on session to IPAM 133 at the occurrence of the event or periodically.

Intelligent network(hereinafter, "IN") service processing function receives and manages IN subscriber information (e.g., subscriber service data, notification cycle, etc) from IPAM 133. In the case of the prepaid IN subscriber, usage-amount data can be transferred to IPAM 133 periodically, and the amount and/or time used can be available as a condition for determining interim cycle of the prepaid IN subscriber. Also, in the case of the prepaid IN subscriber, IPAF 130 internally performs accounting in real time on receiving available time and available usage amount from IPAM 133, and notifies the result to IPAM 133 to perform a session releasing process if the balance exhaustion occurs.

In order to graduate service charges of each service group, IPAM 133 performs a charging-data-collecting function, a signal-processing function, a charging-data-generating/transferring function and IN-service-processing function in cooperation with IWF 113, PDSN 115, IPAF 130, AAA140 and DSCP 145. In examining functions in detail, IPAM 133 comprises plural functions: the cooperating system managing function, the time-synchronizing function, the duplex-managing function, the rule-managing-by-services function, the session managing function, the session data searching function, the IN service processing function, the call controlling function, the charging-data generating function, the charging-data transferring function, the charging-data searching function, the charging-data backup function, system process data recording function, the SUBSINFO-system-cooperating function, the security managing function, etc. Since most functions of IPAM 133 are similar to those of IPAF 130, hereinafter the differences in IPAM 133 will be described.

The cooperating-system-managing function of IPAM 133 manages the defined IPAF 130, DSCP 145, and AAA 140.

Since session data must be managed identically in the duplexed system during the signal processing with the cooperating systems, the duplex-managing function of IPAM 133 performs a mutual signaling process to maintain the same session data, and manages the state of duplexed IPAF 130.

The session-managing function of IPAM 133 deletes the unused session after inspecting the session on where data service is not used for a given period, performs the call release process in cooperation with IWF 113, PDSN 115 and DSCP 145, and records the process details.

The IN-service-processing function of IPAM 133 manages cooperation data of IN system(e.g., DSCP cooperation data, IN service group data, etc), cooperates with specific DSCP that is selected from plural DSCP on the basis of a telephone exchange number, IN service group or operator's definition, and generates charging data including IN service data being transferred from DSCP. In the case of prepaid IN service, IPAM 133 performs accounting based on the usage-amount data being periodically transferred from IPAF 130 in cooperation with DSCP 145. And on receiving interim-cha (ADR=balance exhaustion) message, namely, a balance exhaustion responsed from DSCP 145, IPAM 133 performs the session release process, which requests the session release to IPAF 130, and generates charging data by combining usage-amount data that is collected up to that time. In the prepaid IN service, IPAM 133 periodically performs accounting in cooperation with DSCP 145, and if the call ends, records the sum of usage amount during the session is maintained. The call-controlling function of IPAM 133 requests the call release to PDSN and/or IWF and the session release to IPAF 130 according to the cooperation of external system and demand of the network operator. Also, this function performs the call access control by managing IP pools that PDSN and/or IWF have the right of assigning.

The charging-data-generating function of IPAM 133 generates charging data including session-related data being transferred from PDSN or IWF, usage-amount data being transferred from IPAF 130, and IN data being transferred from DSCP 145. Also, this function determines the generation of charging data according to the defined rule whenever receiving a message from cooperating systems, so if the received message indicates no charging data generation, charging data is not generated, but the process details are recorded. Although accounting is not performed if no usage-amount data is transferred from IPAF 130, however, charging data can be generated based on data being transferred from PDSN and/or IWF according to the definition of process rule of network operator. And, if it is revealed by inspecting message repetition that the received message is repeated, then charging data is not generated but the process details are recorded, and the disconnected call is accounted by use of data being provided from PDSN and/or IWF. If an initial access from PDSN and/or IWF to AAA 140 and/or IPAM 133 fails, "Accounting off" message is transferred in order to release resources, and on receiving this message, IPAM 133 transfers a session end signal to IPAF 130 for releasing the corresponding resources. Even in this case, charging data is not generated but the process details are recorded. As a charging-data transferring function, IPAM 133 works as a RADIUS(Remote Authentication Dial In User Service) client of AAA 140, and if there are more than two AAAs, transfers charging data after selecting a specific AAA based on the telephone exchange number and the network operator's definition. Also, on receiving ACCOUNTING START/STOP REQUEST from PDSN and/or IWF, IPAM 133 transfers ACCOUNTING START/STOP message to IPAF 130. In the abnormal case due to the connection failure or troubles on AAA, IPAM 133 stores charging data temporarily and if the state is changed to normal, then transfers temporarily-stored charging data.

The charging-data-searching function of IPAM 133 searches stored charging data by conditions(e.g., subscriber number, source IP address, destination IP address, service group, usage time, amount of usage, etc) being required by an external system cooperation and network operator's demands, and reports the search result. The charging-data-backup function of IPAM 133 automatically performs backup of stored charging data by predetermined cycle.

The system-process-data-recording function of IPAM 133 records a series of data such as data collection, analyzed data, cooperative process data, abnormal process data, all of them being processed in the system, and provides data that a specific device requests by extracting data corresponding to the request.

The SUBSINFO-system-cooperating function of IPAM 133 can utilize subscriber authentication and authority data directly by cooperating with SUBSINFO(subscriber information) system in the case of need.

The security-managing function of IPAM 133, on detecting an intrusion without permission into the system or the possibility and occurrence of security violation, automatically alerts the network operator, stores data of security violation event, takes system-protecting actions, and stores detailed data of security violation event. Also, IPAM 133 can perform security management on the cooperative system or cooperative protocol, and check and report/record the security state of the system periodically or as a response of the network operator's demand.

If a specific subscriber terminal requests an access to the data network and the use of the wireless data service, AAA 140 performs an authentication, an authority check, and an accounting for the subscriber terminal.

DSCP 145 works as a gateway of SCP 147*a*, 147*b*, . . . , 147*n* (hereinafter, "147") in order to authenticate and account the use of the wireless data service of IN subscriber. When examining DSCP 145 in detail, DSCP 145 can perform the time synchronizing function, a subscriber-authenticating function, the accounting function, a call condition managing function, an AAA cooperating function, a SCP cooperating function, an IPAM 133 cooperating function, a call tracing function, and so on. When describing functions of DSCP 145 in detail, the repeated functions that were already described in IPAF 130 and IPAM 133 will be omitted.

The subscriber-authenticating function of DSCP 145 performs the subscriber authentication in cooperation with SCP 147 when AAA140 that is trying to access transfers an initial access message, and transfers a result of authentication to AAA 140. In addition, DSCP 145 performs the subscriber authentication in cooperation with SCP 147 when IPAM 133 that is trying to access transfers an initial access message, and a result of authentication to IPAM 133. The initial access message may include some parameters such as subscriber information, initial access data(e.g., access network, access service node, start time, and so on), and WIN-INFO message may include detailed IN service subscriber information and interim cycle data for accounting.

The accounting function of DSCP 145, in the case that the subscriber discontinues the call, transfers a charge deduction request to SCP 147 including the sum of the charge to be deducted(hereinafter, "charge deduction") corresponding to INTERIM-CHA message(stop, usage-amount data) and the previous charge deduction corresponding to INTERIM-CHA messages(interim, usage-amount data). And, on receiving the charge deduction result from SCP 147, then DSCP 145 transfers the interim-cha message(charging data) to IPAM 133.

The call condition managing function of DSCP 145 enables a call resource allocation system in higher level to interrogate the validity of the progressing call to the lower-level system and to receive the response from the lower-level system.

On receiving WIN-INFO message from AAA 140, the AAA cooperating function of DSCP 145 in cooperation with SCP 147 acquires balance data, calculates amount of available packets by a rate table(namely, tariff) to decide interim cycle data to be sent to AAA 140, and in the case of balance exhaustion, transfers WIN-INFO response(ADR,Access Denied Reason). The SCP cooperating function of DSCP 145 enables a routing to the SCP 147 that accommodates the subscriber by service/telephone exchange number, and after receiving INTERIM-CHA(stop, usage-amount data) message, namely, the end message from IPAM 133, transfers the charge deduction result to SCP 147.

The call tracing function of DSCP 145 provides the trace function related to the call process in the view of the internal process, and enables the network operator to select the trace functions of the subscriber number and internal processor. Also, the call tracing function may be classified according to the level such as the lowest level(e.g., exchanging messages with external cooperating device) and the highest level(e.g., finding problems between system internal processes including internal process signal).

Also, IAGW 150 shown in FIG. 1 as a gateway system for enabling the subscriber terminal to access to Internet performs a web cashing, a proxy, a conditional access restriction, and so on.

Hereinafter, the accounting procedure for subscriber's usage of wireless data service will be briefly described with reference of system configuration shown in FIG. 1. Firstly, on receiving a call access request through an access network, PDSN 115 transfers SUBSINFO REQUEST, namely, an authentication and a use authority request to AAA 140 and receives SUBSINFO RESPONSE in response of SUBSINFO REQUEST. During this step, BDF 120 duplicates the call access request and transfers the duplicated call access request to IPAS 127.

Then, IPAM 133 in IPAS 127 transfers ACCOUNTING START message to IPAF 130 responsive to ACCOUNTING START REQUEST of PDSN 115. And, on receiving ACCOUNT END REQUEST from PDSN 115, IPAM 133 transfers the ACCOUNT END REQUEST to IPAF 130. Also, IPAF 130 transfers usage-amount data of the subscriber to IPAM 133 till the receipt of the ACCOUNT END REQUEST.

And, on receiving usage-amount data from IPAF 130, IPAM 133 transfers ACCOUNTING REQUEST with usage-amount data to AAA 140 so that the accounting for the subscriber can be performed, and AAA 140 transfers the billing file relevant to the subscriber to IN system(not shown).

And, in the mobile communication network according to one embodiment of the present invention, it is possible to use the classification by destination IP address as the classification of service groups for the subdividing data service charge. Of course, it is apparent that various classification references can be applied to embodiments of the present invention.

Table 1 shows the table configuration of each service group if the service groups are classified by destination IP addresses.

TABLE 1 service classification table by destination IP address

| Service group | Masking | Remark |
|---|---|---|
| A | 255.255.255.255 | |
| A | 255.255.255.0 | N |
| B | 255.255.255.0 | N |
| C | 255.255.255.255 | N |
| C | 255.255.255.255 | Y |
| A | 255.255.255.255 | Y |
| B | 255.255.255.255 | N |

Also, Table 2 shows various exemplary methods for classifying service groups.

TABLE 2 classification rules of service group

| Service group classification rule | Example |
|---|---|
| Destination IP address | 211.218.72.32, 211.218.72.xxx |
| Socket(destination IP address + port) | 211.218.72.32 + Port 1234 |
| Destination URL | URL, Hostname, file, directory, etc |
| Protocol | HTTP, FTP, TCP, UDP. RTP, L2TP, PPTP, IP in IP |
| content | text, picture, music, game, moving picture, mail, MMS |
| Data service node | PDSN, IWF, GGSN, etc |
| Access network | IS-94A/B, Cdma2000 1x, 1xEV-DO, WCDMA, WLAN |
| services subscribed by user | VPN, CDA, UAGW, QoS |

Figure 2:
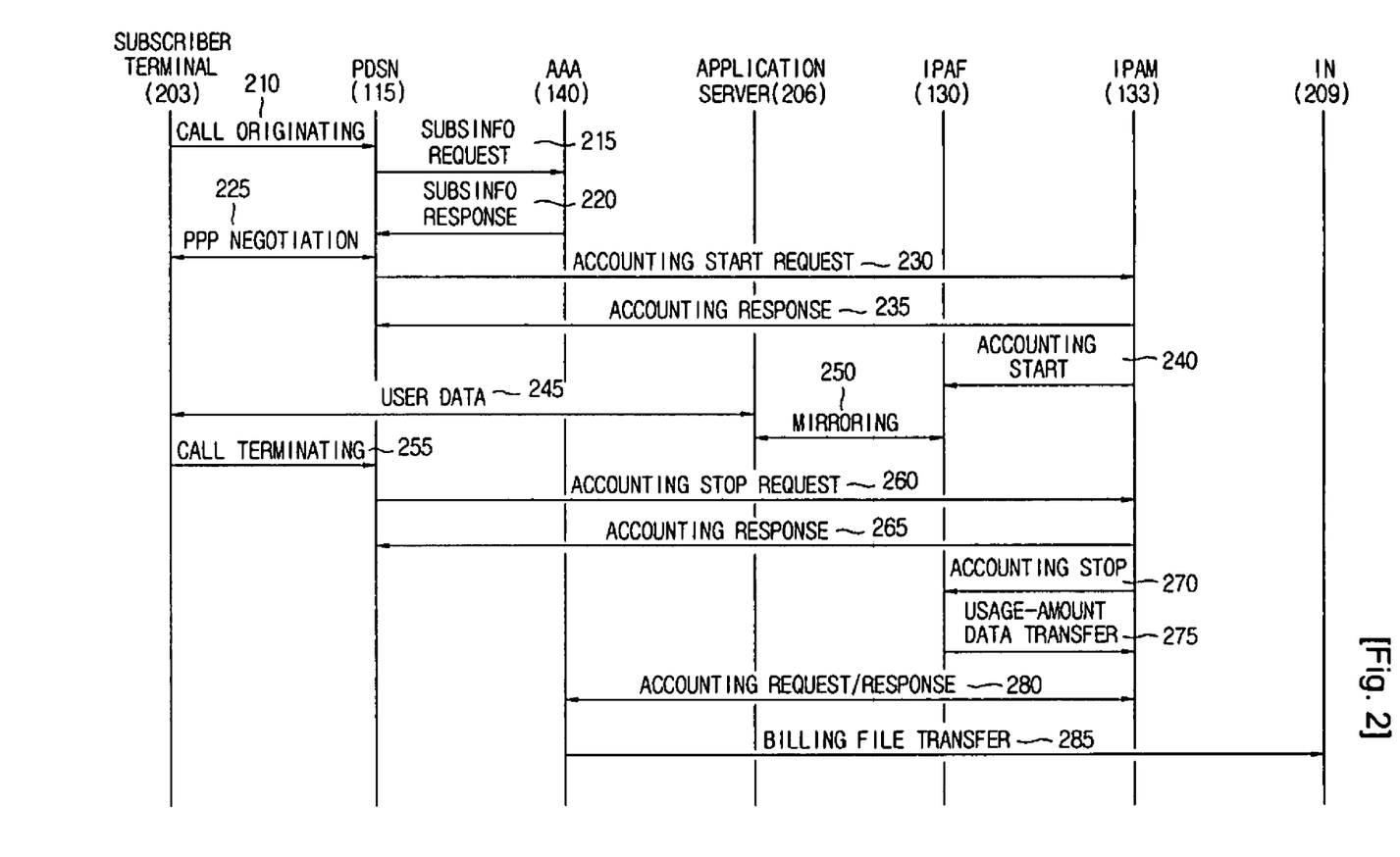
FIG. 2 is a flowchart for processing data call and billing process for the basic service subscriber according to one embodiment of the present invention.

FIG. 2 is a flowchart for processing data call and billing process for the basic service subscriber according to one embodiment of the present invention. Namely, FIG. 2 shows the procedure for processing data call and billing process when PDSN is an end node of PPP.

Referring to FIG. 2, at step 210, PDSN 115 receives an originating call signal from a subscriber terminal 203 that wants to use a wireless data service. At step 215, PDSN 115 transfers SUBSINFO REQUEST for the subscriber terminal to AAA 140. At step 220, AAA 140 transfers SUBSINFO RESPONSE in response to SUBSINFO REQUEST to PDSN 115 via network.

And, at step 225, PPP connection between PDSN 115 and the subscriber terminal 203 is established.

Then, at step 230,1 PDSN 115 transfers ACCOUNTING START REQUEST for the subscriber's use of wireless data service to IPAM 133. ACCOUNTING START REQUEST may include MIN(Mobile Identification Number) information of the subscriber terminal 203, IP address information of the subscriber terminal 203, IP address information of PDSN. At step 235, IPAM 133 transfers ACCOUNTING RESPONSE in response to ACCOUNTING START REQUEST to PDSN 115, and at step 240, transfers ACCOUNTING START message for the subscriber terminal's use of wireless data service 204 to IPAF 130. ACCOUNTING START message may include session information.

At step 245, user data(e.g., data transmission request, URL access request, etc) or web data is communicated between the subscriber terminal 203 and the application server 206, and at step 250, IPAF 130 charges by mirroring user data communication being performed through the application server 206. In this case, BDF 120 and EDF 125 are used.

On receiving a call end request from the subscriber terminal 203 at step 255, PDSN 115 transfers ACCOUNTING STOP REQUEST to IPAM 133 at step 260. ACCOUNTING STOP REQUEST may include MIN information, IP address information, release indicator, and usage-amount data.

At step 265, IPAM 133 transfers ACCOUNTING RESPONSE in response to ACCOUNTING STOP REQUEST to PDSN 115, and at step 270, transfers ACCOUNTING STOP message to IPAF 130. ACCOUNTING STOP message may include session information.

At step 275, IPAF 130 transfers usage-amount-by-category data to IPAM 133.

IPAM 133 generates charging data by use of session information from PDSN 115 and usage-amount-by-category data from IPAF 130, and at step 280, communicates ACCOUNTING REQUEST/RESPONSE with AAA 140. And at step 285, AAA 140 transfers billing file to IN system 209.

Figure 3:
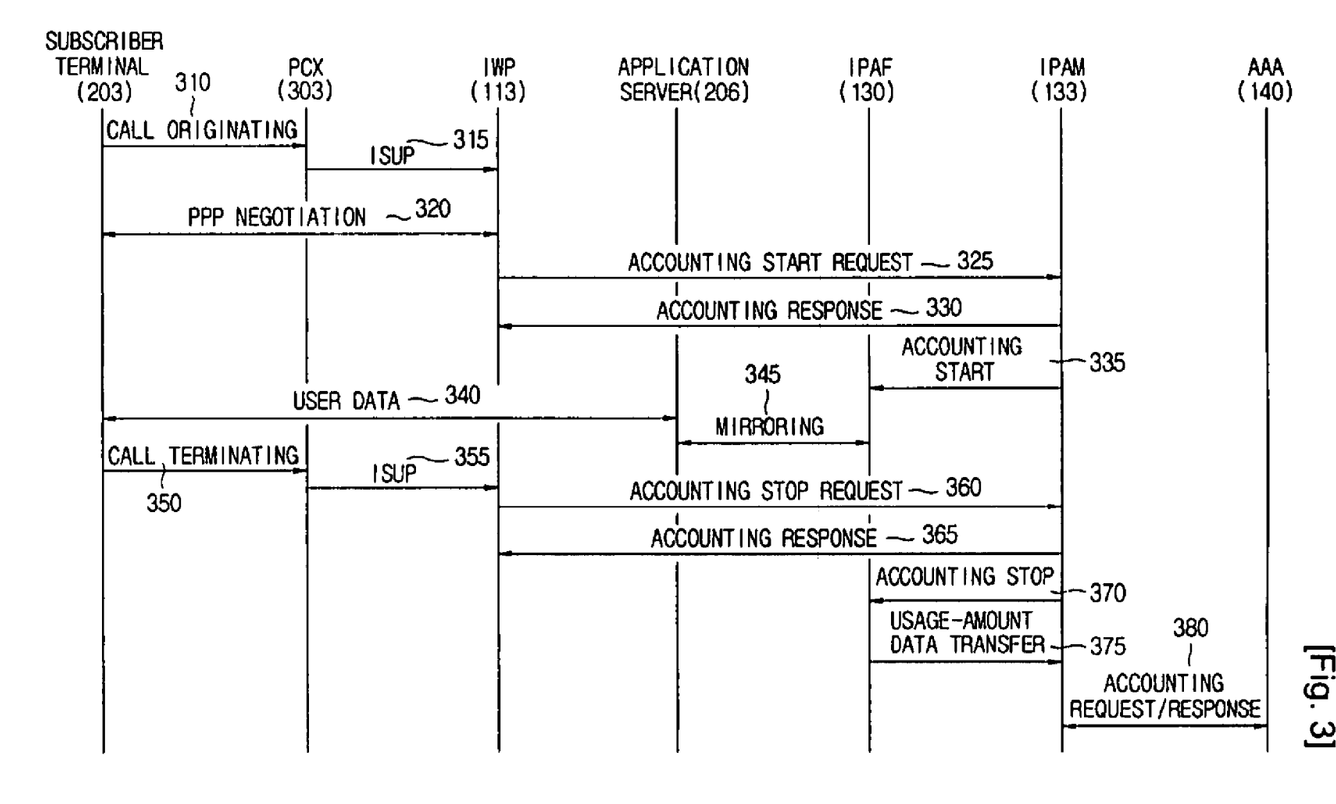
FIG. 3 is a flowchart for processing data call and billing process for the basic service subscriber according to another embodiment of the present invention.

FIG. 3 is a flowchart for processing data call and billing process for the basic service subscriber according to another embodiment of the present invention. Namely, FIG. 3 shows the procedure for processing data call and billing process when IWF 113 is an end node of PPP.

Referring to FIG. 3, at step 310, PCX 303 receives an originating call signal from a subscriber terminal 203 that wants to use a wireless data service, and at step 315, PCX 303 transfers ISUP message for establishing PPP connection to the subscriber terminal to IWF 113. In this case, PCX 303 may be the one of a calling PCX and a called PCX, and work as being distinguished.

And, at step 320, PPP connection between IWF 113 and the subscriber terminal 203 is established.

Then, at step 325, IWF 113 transfers ACCOUNTING START REQUEST for the subscriber's use of wireless data service, to IPAM 133. ACCOUNTING START REQUEST may include MIN information of the subscriber terminal 203, IP address information of the subscriber terminal 203, IP address information of IWF. At step 330, IPAM 133 transfers ACCOUNTING RESPONSE in response to ACCOUNTING START REQUEST to IWF 113, and at step 335, transfers ACCOUNTING START message for the subscriber terminal's use of wireless data service to IPAF 130. ACCOUNTING START message may include session information.

At step 340, user data(e.g., data transmission request, URL access request, etc) or web data(hereinafter, "data call signal") is communicated between the subscriber terminal 203 and the application server 206, and at step 345, IPAF 130 charges by mirroring the data call signal communication being performed through the application server 206. In this case, BDF 120 and EDF 125 are used.

On receiving a call end request from the subscriber terminal 203 at step 350, PCX 303 transfers ISUP message for releasing PPP connection between the subscriber terminal 203 and IWF 113 to IWF 113 at step 355.

At step 360, IWF 113 transfers ACCOUNTING STOP REQUEST to IPAM 133. ACCOUNTING STOP REQUEST may include MIN information, IP address information, release indicator, IP address information of IWF and usage-amount data. At step 365, IPAM 133 transfers ACCOUNTING RESPONSE in response to ACCOUNTING STOP REQUEST to IWF 113, and at step 370, transfers ACCOUNTING STOP message to IPAF 130. ACCOUNTING STOP message may include session information.

At step 375, IPAF 130 transfers usage-amount-by-category data to IPAM 133.

IPAM 133 generates charging data by use of session information from IWF 113 and usage-amount-by-category data from IPAF 130, and at step 380, communicates ACCOUNTING REQUEST/RESPONSE with AAA 140.

Figure 4:
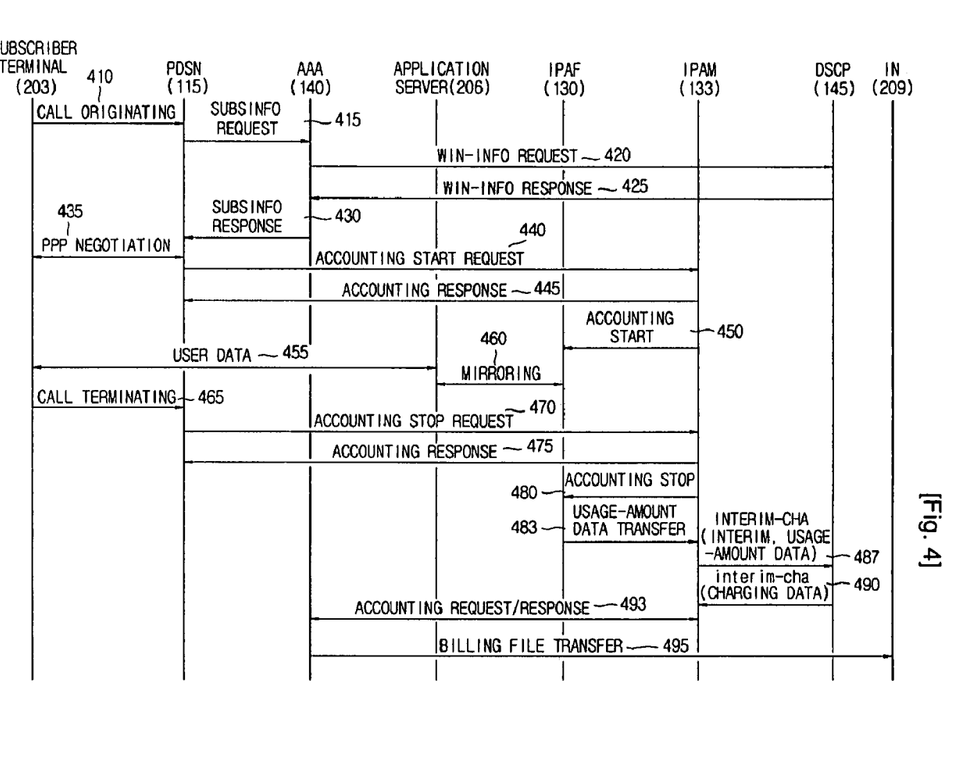
FIG. 4 is a flowchart for processing data call and billing process for the prepaid IN service subscriber according to one embodiment of the present invention.

FIG. 4 is a flowchart for processing data call and billing process for the prepaid IN service subscriber according to one embodiment of the present invention. Namely, FIG. 4 shows the procedure for processing data call and billing process when PDSN is an end node of PPP. Unlikely to the cases of FIG. 2 and FIG. 3, the balance exhaustion before or during providing the service may occur in the case of the prepaid IN service subscriber, and these cases will be described in FIG. 5 and 6.

Referring to FIG. 4, at step 410, PDSN 115 receives an originating call signal from the subscriber terminal 203 that wants to use wireless data service. At step 415, PDSN 115 transfers SUBSINFO REQUEST for the subscriber terminal 203 to AAA 140. At step 420, AAA 140 transfers WIN-INFO REQUEST, namely, subscriber information request, to DSCP 145. WIN-INFO REQUEST may include MIN information of the subscriber terminal 203 and initial access information.

At step 425, on receiving WIN-INFO REQUEST from AAA 140, DSCP 145 acquires balance data of the subscriber by cooperating with SCP 147, calculates amount of available packets by a rate table, and transfers WIN-INFO response, namely, subscriber detail data(e.g., IN information, amount-of-available-packets data, interim cycle data) to AAA 140. At step 430, by use of WIN-INFO response being received from DSCP 145, AAA 140 transfers SUBSINFO RESPONSE in response to SUBSINFO REQUEST to PDSN 115 via network.

And, at sep 435, PPP connection between PDSN 115 and the subscriber terminal 203 is established.

Then, at step 440, PDSN 115 transfers ACCOUNTING START REQUEST for the subscriber's use of wireless data service to IPAM 133. ACCOUNTING START REQUEST may include MIN information of the subscriber terminal 203, IP address information of the subscriber terminal 203, IP address information of PDSN, and IN information. At step 445, IPAM 133 transfers ACCOUNTING RESPONSE in response to ACCOUNTING START REQUEST to PDSN 115, and at step 450, transfers ACCOUNTING START message for the subscriber terminal's use of wireless data service 204 to IPAF 130. ACCOUNTING START message may include session information.

At step 455, data call signal is communicated between the subscriber terminal 203 and the application server 206, and at step 460, IPAF 130 charges by mirroring data call signal communication being performed through the application server 206. In this case, BDF 120 and EDF 125 are used. On receiving a call end request from the subscriber terminal 203 at step 465, PDSN 115 transfers ACCOUNTING STOP REQUEST to IPAM 133 at step 470. ACCOUNTING STOP REQUEST may include MIN information, IP address information of the subscriber terminal, IN information, IP address information of PDSN, release indicator, and usage-amount data.

At step 475, IPAM 133 transfers ACCOUNTING RESPONSE in response to ACCOUNTING STOP REQUEST to PDSN 115, and at step 480, transfers ACCOUNTING STOP message to IPAF 130. ACCOUNTING STOP message may include session information.

At step 483, IPAF 130 transfers usage-amount-by-category data to IPAM 133. IPAM 133 generates INTERIM-CHA message(interim, usage-amount data) by use of session information from PDSN 115 and usage-amount-by-category data from IPAF 130, and at step 487, transfers INTERIM-CHA message(interim, usage-amount data) of the subscriber to DSCP 145. INTERIM-CHA message(interim, usage-amount data) may include MIN information, IN information, and usage-amount-by-category data. And, at step 490, IPAM 133 receives INTERIM-CHAR message(charging data) from DSCP 490. The interim-cha message(charging data) includes charge corresponding to usage-amount-by-category data. The interim-charging procedure of step 487 to sep 490 may be performed periodically even on using the wireless data service(e.g., before receiving ACCOUNTING STOP message).

And, at step 493, IPAM 133 communicates ACCOUNTING REQUEST/RESPONSE with AAA 140, and at step 285, AAA 140 transfers billing file to IN 209.

Figure 5:
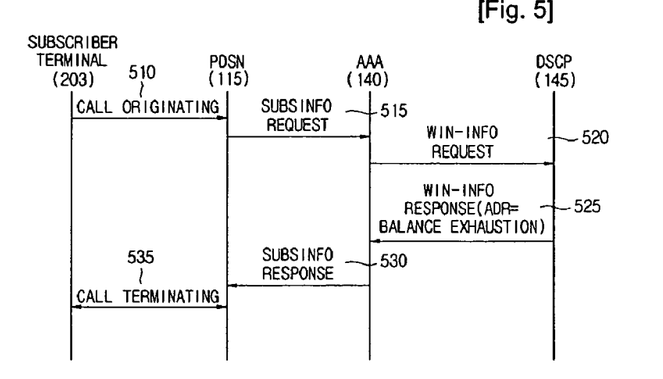
FIG. 5 is a flowchart for processing data call and billing process for the prepaid IN service subscriber according to another embodiment of the present invention.

FIG. 5 is a flowchart for processing data call and billing process for the prepaid IN service subscriber according to another embodiment of the present invention. Namely, FIG. 5 shows the procedure for processing data call and billing process when PDSN is an end node of PPP and the balance is already exhausted before providing the service so that the attempted call fails.

Referring to FIG. 5, at step 510, PDSN 115 receives an originating call signal from the subscriber terminal 203 that wants to use wireless data service. At step 515, PDSN 115 transfers SUBSINFO REQUEST to AAA 140. At step 520, AAA 140 transfers WIN-INFO REQUEST for subscriber information to DSCP 145. WIN-INFO may include MIN information of the subscriber terminal 203 and initial access information.

At step 525, on receiving WIN-INFO REQUEST from AAA 140, DSCP 145 acquires balance data of the subscriber by cooperating with SCP 147, recognizes that the balance of the subscriber is exhausted, and then transfers WIN-INFO RESPONSE(ADR=balance exhaustion) to AAA 140.

At step 530, by use of WIN-INFO RESPONSE being received from DSCP 145, AAA 140 transfers SUBSINFO RESPONSE(e.g., Result=Unsuccessful, ADR=Balance Exhaustion) in response to SUBSINFO REQUEST to PDSN 115 via network.

And, at step 535, PDSN 115 terminates the call from the subscriber terminal 203.

Figure 6:
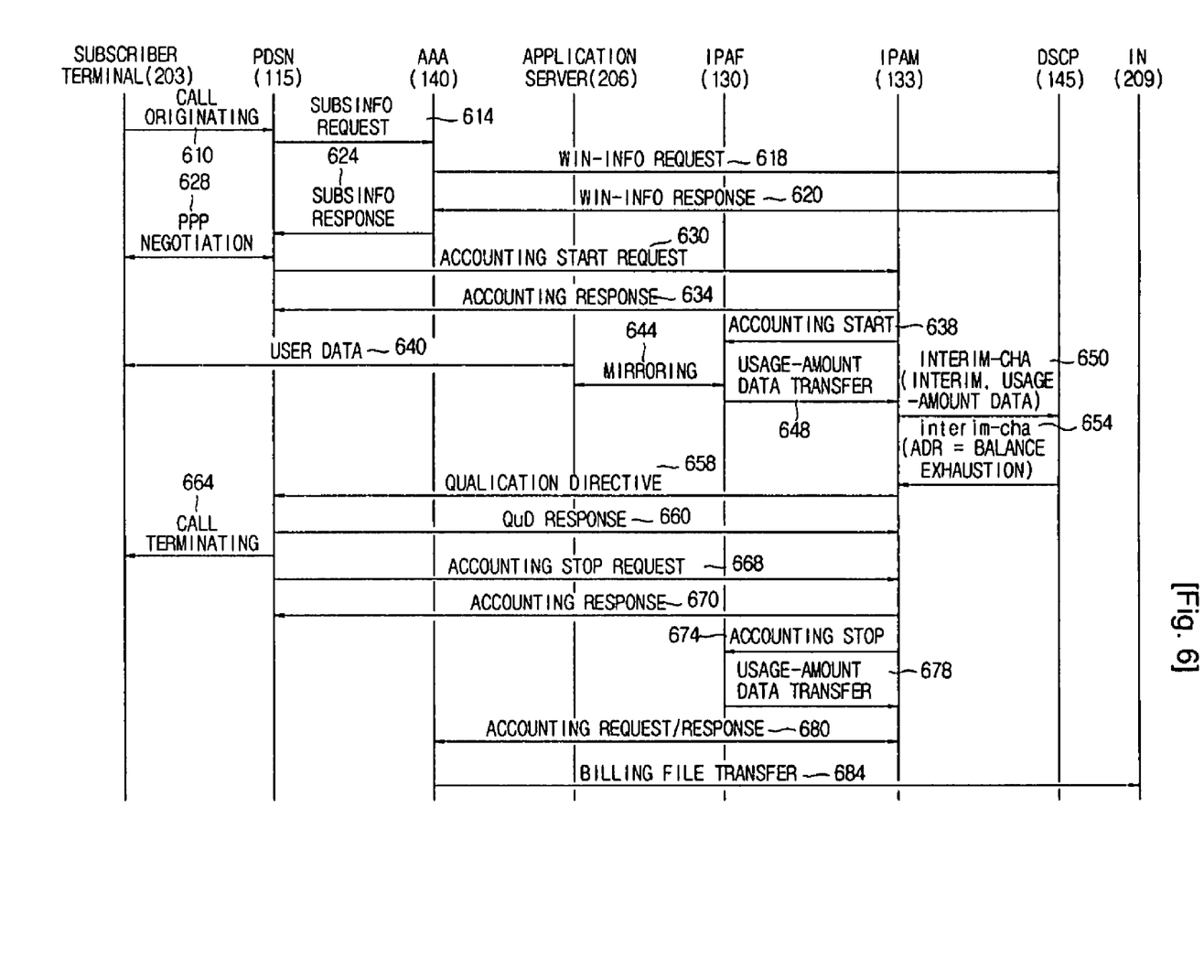
FIG. 6 is a flowchart for processing data call and billing process for the prepaid IN service subscriber according to another embodiment of the present invention.

FIG. 6 is a flowchart for processing data call and billing process for the prepaid IN service subscriber according to another embodiment of the present invention. Namely, FIG. 6 shows the procedure for processing data call and billing process when PDSN is an end node of PPP and the balance is exhausted during providing the service. Because the steps 610 to 644 are identical to the steps 410 to 460 of FIG. 4, same description will be omitted here.

Referring to FIG. 6, at step 648, IPAF 130, which charges by mirroring data call signal communication being performed through the application server 206, transfers usage-amount-by-category data to IPAM 133. At step 650, IPAM 133 transfers INTERIM-CHA message(interim, usage-amount data) to DSCP 145, and receives interim-char message(charging data) from DSCP when the subscriber's balance is not exhausted at step 654. If the subscriber's balance is exhausted, IPAM 133 receives interim-char message (ADR=balance exhaustion) from DSCP. INTERIM-CHA message(interim, usage-amount data) of step 650 may include MIN information, IN information, and usage-amount-by-category data.

Also, since the data flowchart of FIG. 6 is applied to the prepaid IN service subscriber, it is apparent that transmissions of INTERIM-CHA message(interim, usage-amount data) and interim-char message(charging data) between IPAM 133 and DSCP 145 can be periodically performed before the step 654 of transmitting interim-char message (ADR=balance exhaustion) in order to determine whether the balance is exhausted or not on using wireless data service.

Since the balance of the prepaid subscriber for the wireless data service is exhausted, at step 658, IPAM 133 transfers QUALICATION DIRECTIVE message(reason=balance exhaustion), namely, a service restriction request, to PDSN 115. At step 660, PDSN 115 transfers QuD RESPONSE in response to QUALICATION DIRECTIVE to IPAM 133, and at step 664, terminates the call from the subscriber terminal 203.

And, at step 668, PDSN 115 transfers ACCOUNTING STOP REQUEST to IPAM 133, and ACCOUNTING STOP REQUEST may include MIN information, IP address information, IP address information of PDSN, IN information, a release indicator, and usage-amount data. At step 670, IPAM 133 transfers ACCOUNTING RESPONSE in response to ACCOUNTING STOP REQUEST to PDSN 115, and at step 674, transfers ACCOUNTING STOP message to IPAF 130. ACCOUNTING STOP message may include session information.

At step 678, IPAF 130 transfers usage-amount-by-category data to IPAM 133. And, at step 680, IPAM 133 communicates ACCOUNTING REQUEST/RESPONSE with AAA 140, and at step 684, AAA 140 transfers billing file to IN system 209.

Figure 7:
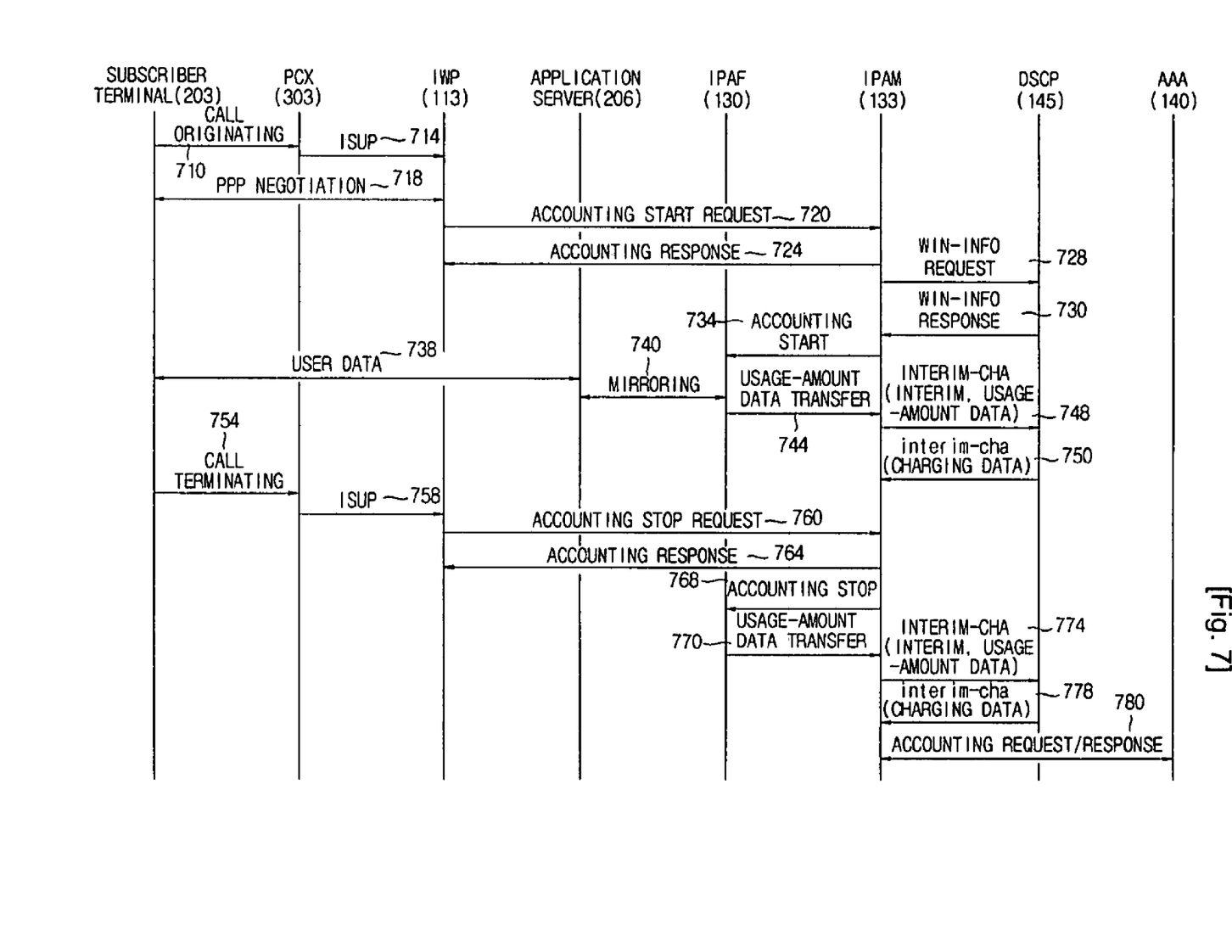
FIG. 7 is a flowchart for processing data call and billing process for the prepaid IN service subscriber according to one embodiment of the present invention.

FIG. 7 is a flowchart for processing data call and billing process for the prepaid IN service subscriber according to one embodiment of the present invention. Namely, FIG. 7 shows the procedure for processing data call and billing process when IWF is an end node of PPP.

Referring to FIG. 7, at step 710, PCX 303 receives an originating call signal from the subscriber terminal 203 that wants to use wireless data service. At step 714, PCX 303 transfers ISUP message for establishing PPP connection to IWF 113. In this case, PCX 303 may be the one of a calling PCX and a called PCX, and work as being distinguished. And, at step 718, PPP connection between IWF 113 and the subscriber terminal 203 is established.

Then, at step 720, IWF 113 transfers ACCOUNTING START REQUEST for the subscriber's use of wireless data service to IPAM 133. ACCOUNTING START REQUEST may include MIN information of the subscriber terminal 203, IN information, IP address information of the subscriber terminal 203, and IP address information of IWF. At step 724, IPAM 133 transfers ACCOUNTING RESPONSE in response to ACCOUNTING START REQUEST to IWF 113, and at step 728, transfers WIN-INFO REQUEST for the subscriber terminal's use of wireless data service to DSCP 145. WIN-INFO REQUEST may include MIN information of the subscriber terminal 203, IN information, and IWF information.

At step 730, on receiving WIN-INFO REQUEST from IPAM 133, DSCP 145 acquires balance data of the subscriber by cooperating with SCP 147, calculates amount of available packets by a rate table, and transfers WIN-INFO RESPONSE, namely, subscriber detail data(e.g., IN information, amount-of-available-packets data, interim cycle data) to IPAM 133. At step 734, IPAM 133 transfers ACCOUNTING START message for the use of wireless data service to IPAF 130. ACCOUNTING START message may include session information.

At step 738, data call signal is communicated between the subscriber terminal 203 and the application server 206, and at step 740, IPAF 130 charges by mirroring data call signal communication being performed through the application server 206. In this case, BDF 120 and EDF 125 are used.

And, at step 744, IPAF 130 transfers usage-amount-by-category data to IPAM 133.

At step 748, IPAM 133 transfers INTERIM-CHA message (interim, usage-amount data) to DSCP 145, and receives interim-cha message(charging data) from DSCP 145. The interim-cha message(charging data) includes charge corresponding to usage-amount-by-category data. Also, interim-cha message from DSCP 145 may include ADR. And, since the balance can be exhausted during using wireless data service in the case of the prepaid IN service subscriber, the procedure of transmitting INTERIM-CHA messages at step 748 and 750 may be performed periodically.

If the balance of the subscriber for the wireless data service is not exhausted, PCX 303 waits until receiving a call end request from the subscriber terminal 203.

Then, if PCX 303 receives the call end request from the subscriber terminal 203 in the state of valid balance data (namely, not exhausted) at step 754, PCX 303 transfers ISUP message for releasing PPP connection between IWF 113 and the subscriber terminal 203 to IWF 113 at step 758. IWF 113 at step 760 transfers ACCOUNTING STOP REQUEST to IPAM 133. ACCOUNTING STOP REQUEST may include MIN information of the subscriber terminal 203, IP address information, a release indicator, and IP address information of IWF.

At step 764, IPAM 133 transfers ACCOUNTING RESPONSE in response to ACCOUNTING STOP REQUEST to IWF 113, and at step 768 transfers to ACCOUNTING STOP message to IPAF 130. ACCOUNTING STOP message may include session information.

At step 770, IPAF 130 transfers usage-amount-by-category data relevant to the subscriber to IPAM 133.

IPAM 133 generates INTERIM-CHA message(stop, usage-amount data) by use of session information from IWF 113 and usage-amount-by-category data from IPAF 130, and at step 774, transfers INTERIM-CHA message(stop, usage-amount data) to DSCP 145 and at step 778, receives interim-cha message(charging data) from DSCP 145. INTERIM-CHA message(stop, usage-amount data) may include MIN information, IN information, and usage-amount-by-category data.

Then, at step 780, IPAM 133 communicates ACCOUNTING REQUEST/RESPONSE with AAA 140.

Figure 8:
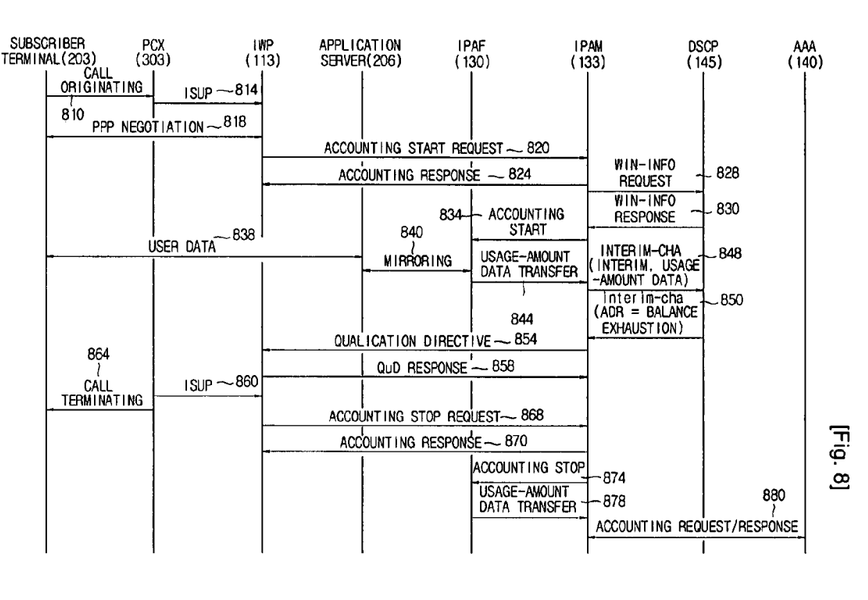
FIG. 8 is a flowchart for processing data call and billing process for the prepaid IN service subscriber according to one embodiment of the present invention.

FIG. 8 is a flowchart for processing data call and billing process for the prepaid IN service subscriber according to one embodiment of the present invention. Namely, FIG. 8 shows the procedure for processing data call and billing process when IWF is an end node of PPP and the balance is exhausted during providing the service.

Also, though the subscriber is an IN service subscriber and the balance was already exhausted before using service, however, the IN system performs a call failure process so that the cooperating or billing procedure with IPAF 130 or IPAM 133 is not performed. Because the steps 810 to 848 are identical to the steps 710 to 748 of FIG. 7, same description will be omitted here.

Referring to FIG. 8, DSCP 145 receives INTERIM-CHA message(interim, usage-amount data) from IPAM 133 and determines whether the balance of the subscriber is exhausted or not. At step 850, DSCP 145 transfers INTERIM-CHA message(ADR=balance exhaustion) to IPAM 133 when the balance is exhausted.

At step 854, IPAM 133 transfers QUALICATION DIRECTIVE(reason=balance exhaustion), namely, a service restriction request to IWF 113. At step 858, IWF 113 transfers QuD RESPONSE as a response of QUALICATION DIRECTIVE to IPAM 133, and at step 860, transfers ISUP message to PCX 303 in order to terminate the call from the subscriber terminal 203. PCX 303 terminates the call at step 864.

And, at step 868, IWF 113 transfers ACCOUNTING STOP REQUEST to IPAM 133. ACCOUNTING STOP REQUEST may include MIN information, IP address information, IP address information of IWF, and a release indicator. At step 870, IPAM 133 transfers ACCOUNTING RESPONSE in response to ACCOUNTING STOP REQUEST to IWF 113, and at step 874, transfers ACCOUNTING STOP message to IPAF 130. ACCOUNTING STOP message may include session information.

At step 878, IPAF 130 transfers usage-amount-by-category data to IPAM 133. And, at step 880, IPAM 133 communicates ACCOUNTING REQUEST/RESPONSE with AAA 140.

Figure 9:
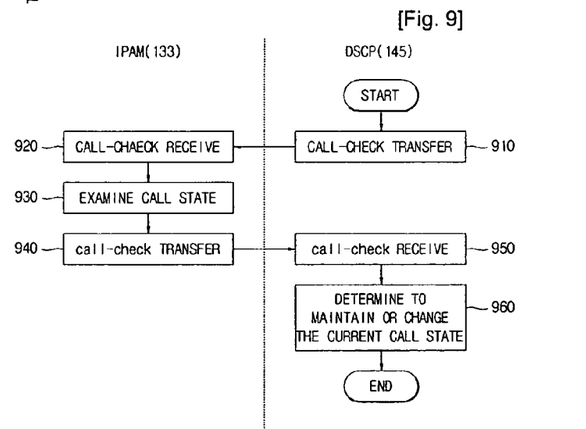
FIG. 9 is a flowchart of showing a call check procedure for the prepaid IN service subscriber according to one embodiment of the present invention.

FIG. 9 is a flowchart of showing a call check procedure for the prepaid IN service subscriber according to one embodiment of the present invention. Namely, FIG. 9 shows the operations of IPAM 133 and DSCP 145 when the prepaid IN service subscriber uses the wireless data service through IWF or PDSN.

Referring to FIG. 9, at step 910, DSCP 145 transfers CALL-CHECK message for interrogating the call state between PDSN/IWF and the subscriber terminal to IPAM 133. At step 920, IPAM 133 receives CALL-CHECK message from DSCP 145, and at step 930, examines whether the call state is active or idle. And at step 940, IPAM 133 transfers call-check message, namely, the result of step 930 to DSCP 145.

At step 950, DSCP 145 receives call-check message from IPAM 133. And at step 960, DSCP 145 determines to maintain or change the current call state based on the result of step 930, and performs proper operation. That is, if the examination result from IPAM 133 indicates that the current session state is active(e.g., call-check(MIN, call ID, call sts=Active)), DSCP 145 maintains the current call state, but if the current session state is idle(e.g., call-check(MIN, call ID, call sts=Idle)), then releases the current call resource.

As aforementioned, the method and system for subdividing data service charge in the mobile communication network according to the present invention can apply the graduated service charge schedule to various service groups respectively.

Also, the present invention can work as an independent network node rather than generates CDR for graduated billing by capturing and analyzing all packets on the network.

Another aspect of the invention is a computer-readable medium including a program containing computer-executable instructions for performing the method for billing a prepaid subscriber for a wireless data service usage in a mobile communication network, the method comprising: i) receiving a billing initiation request signal from a wireless data service device, wherein the wireless data service device is either an interworking function (IWF) unit or a packet data serving node (PDSN), ii) responsive to the received billing initiation request signal, producing a usage-amount data for the subscriber based on at least one of the type and amount of data being transmitted through the wireless data service device and iii) responsive to a billing end request signal, received from the wireless data service device, transferring a billing request signal, indicative of a request to bill the subscriber for the usage-amount data, to an authentication, authorization and accounting (AAA) unit.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by the appended claims rather than by the foregoing description. All variations coming within the meaning and range of equivalency of the claims are embraced within their scope.

The invention claimed is:

1. A method of billing a prepaid subscriber for a wireless data service usage in a mobile communication network, said method comprising:
receiving a billing initiation request signal from a wireless data service device, wherein the wireless data service device is one of the following: an interworking function (IWF) unit and a packet data serving node (PDSN);
responsive to the received billing initiation request signal, producing a usage-amount data for the subscriber based on the amount of data traffic that is duplicated and transferred to a dedicated accounting device by a data transferring device, wherein the usage-amount data is configured to apply different data service charges to each of a plurality of service categories which are provided to the subscriber;

transferring, via a communication network the usage-amount data to a data service control point (DSCP);

receiving, via a communication network, balance exhaustion data from the DSCP, wherein the balance exhaustion data indicates that no balance for the prepaid subscriber remains;

transmitting, via a communication network, the balance exhaustion data to the wireless data service device, wherein the wireless data service device is configured to restrict the subscriber to use the wireless data service based on the balance exhaustion data, and wherein the wireless data service device is configured not to determine whether the balance has been exhausted; and responsive to a billing end request signal received from the wireless data service device, transferring a billing request signal, indicative of a request to bill the subscriber for the usage-amount data to an authentication, authorization and accounting (AAA) unit.

2. The method as stated in claim 1, further comprising:
(a) receiving a balance remaining data, indicating a remaining balance for the prepaid subscriber, from the DSCP; and
(b) periodically repeating (a) until receiving either the billing end request signal or the balance exhaustion data from the DSCP.

3. The method as stated in claim 2, wherein if the wireless data service device is the IWF unit, said method further comprises:
transferring a subscriber information request signal to the DSCP; and
receiving a subscriber detail information from the DSCP.

4. The method of claim 1, wherein each of the plurality of service categories is classified according to one of the following: 1) destination IP address, 2) socket (destination IP address+port), 3) destination URL, 4) communication protocol, 5) content of data, 6) type of data service node, 7) type of access network and 8) type of service provided to a user.

5. The method of claim 1, wherein the wireless data service device is configured to restrict the subscriber to use the wireless data service if the wireless data service device receives the balance exhaustion data from an Internet protocol accounting system (IPAS).

6. A method of billing a prepaid subscriber for a wireless data service usage in a mobile communication network, said method comprising:
receiving, at a packet data serving node (PDSN), a call originating signal from a subscriber terminal;
transferring, based on the call originating signal, an authentication request signal for the subscriber to an authentication, authorization and accounting (AAA) unit;
establishing a call connection with the subscriber terminal, upon authentication by the AAA unit, and transferring a billing initiation request signal to a dedicated accounting device;
in response to the billing initiation request signal, producing, at the dedicated accounting device, a usage-amount data for the subscriber based on the amount of data traffic that is duplicated and transferred through the PDSN, wherein the usage-amount data is configured to apply different data service charges to each of a plurality of service categories which are provided to the subscriber;
receiving, at the PDSN, a call end request signal from the subscriber terminal;
transferring a billing end request signal to the dedicated accounting device based on the call end request signal;
transferring, via a communication network the usage-amount data to a data service control point (DSCP);
receiving, via a communication network, balance exhaustion data from the DSCP, wherein the balance exhaustion data indicates that no balance for the prepaid subscriber with respect to a wireless data service remains;
transmitting, via a communication network, the balance exhaustion data to the PDSN, wherein the PDSN is configured to restrict the subscriber to use the wireless data service based on the balance exhaustion data, and wherein the PDSN is configured not to determine whether the balance has been exhausted;
in response to the billing end request signal, transferring a billing request signal, indicative of a request to bill the subscriber for the usage-amount data, to the AAA unit; and
in response to the billing request signal, transferring a billing file to a billing management device.

7. The method as stated in claim 6, further comprising:
(a) transferring a subscriber information request signal from the AAA unit to the DSCP and receiving a subscriber detail data as a response from the DSCP;
(b) receiving a balance remaining data, indicating a remaining balance for the prepaid subscriber, from the DSCP; and
(c) repeating (b) until receiving either the billing end request signal or the balance exhaustion data from the DSCP.

8. The method of claim 6, wherein each of the plurality of service categories is classified according to one of the following: 1) destination IP address, 2) socket (destination IP address+port), 3) destination URL, 4) communication protocol, 5) content of data, 6) type of data service node, 7) type of access network and 8) type of service provided to a user.

9. The method of claim 6, wherein the PDSN is configured to restrict the subscriber to use the wireless data service if the PDSN receives the balance exhaustion data from an Internet protocol accounting system (IPAS).

10. A method of billing a prepaid subscriber for a wireless data service usage in a mobile communication network, said method comprising:
receiving, at an interworking function (JWF) unit, a call originating signal from a subscriber terminal;
establishing, based on the call originating signal, a call connection with the subscriber terminal and transferring a billing initiation request signal to a dedicated accounting device;
in response to the billing initiation request signal, producing, at the dedicated accounting device, a usage-amount data for the subscriber based on the amount of data traffic that is duplicated and transferred through the IWF unit, wherein the usage-amount data is configured to apply different data service charges to each of a plurality of service categories which are provided to the subscriber;
receiving, at the IWF unit, a call end request signal from the subscriber terminal;
transferring, via a communication network the usage-amount data to a data service control point (DSCP);
receiving, via a communication network, balance exhaustion data from the DSCP, wherein the balance exhaustion data indicates that no balance for the prepaid subscriber with respect to a wireless data service remains;

transmitting, via a communication network, the balance exhaustion data to the IWF unit, wherein the IWF unit is configured to restrict the subscriber to use the wireless data service based on the balance exhaustion data, and wherein the IWF unit is configured not to determine whether the balance has been exhausted;

in response to the call end request signal, transferring a billing end request signal to the dedicated accounting device;

in response to the billing end request signal, transferring a billing request signal, indicative of a request to bill the subscriber, for the usage-amount data, to an authentication, authorization and accounting (AAA) unit; and transferring, based on the billing request signal, a billing file to a billing management device.

11. The billing method as stated in claim 10, further comprising:

(a) transferring a subscriber information request from the dedicated accounting device to the DSCP and receiving a subscriber detail data as a response from the DSCP;

(b) receiving a balance remaining data, indicating a remaining balance for the prepaid subscriber, from the DSCP; and (c) periodically repeating (b) until receiving either the billing end request signal or the balance exhaustion data.

12. The method of claim 10, wherein each of the plurality of service categories is classified according to one of the following: 1) destination IP address, 2) socket (destination IP address+port), 3) destination URL, 4) communication protocol, 5) content of data, 6) type of data service node, 7) type of access network and 8) type of service provided to a user.

13. The method of claim 10, wherein the IWF unit is configured to restrict the subscriber to use the wireless data service if the IWF unit receives the balance exhaustion data from an Internet protocol accounting system (IPAS).

14. A dedicated accounting device for billing a prepaid subscriber for a wireless data service usage in a mobile communication network, comprising:

a first data transferring device configured to duplicate data between a packet data serving node (PDSN) or an interworking function (IWF) unit and an application server and transfer said duplicated data to an Internet protocol accounting filter (IPAF);

a second data transferring device configured to duplicate data between said PDSN or said IWF unit and an application server and transfer said duplicated data to a data analysis system (DTAS);

the IPAF being configured to produce a usage-amount data for the prepaid subscriber based on the amount of data traffic that is duplicated and transferred to or from a terminal of the prepaid subscriber on the mobile communication network, wherein the usage-amount data is configured to apply different data service charges to each of a plurality of service categories which are provided to the subscriber; and an Internet protocol accounting manager (IPAM), in data communication with said IPAF, the PDSN, the IWF unit, a data service control point (DSCP), and an authentication, authorization and accounting (AAA) unit, the IPAM being configured to i) manage said IPAF to produce the usage-amount data, ii) transfer the usage-amount data to said DSCP, iii) receive either a balance remaining data, indicating a remaining balance for the prepaid subscriber, or a balance exhaustion message, indicating that no balance for the prepaid subscriber remains, and iv) transfer the balance remaining data to said AAA unit, in response to a billing end request signal, received from one of said PDSN and said IWF unit, or the balance exhaustion message, received from said DSCP, wherein the IPAM is further configured to transmit, via a communication network, the balance exhaustion message to the PDSN or IWF unit which is configured to restrict the subscriber to use the wireless data service based on the balance exhaustion message wherein the PDSN or IWF unit is configured not to determine whether the balance has been exhausted.

15. The dedicated accounting device as stated in claim 14, wherein said IPAF periodically transfers the usage-amount data to said IPAM, wherein said IPAM transfers the periodically-transferred usage-amount data to the DSCP and receives the balance remaining data, and wherein said IPAM sums at least one balance remaining data and transfers the summed amount to the AAA unit in response to the billing end request signal or the balance exhaustion message.

16. The dedicated accounting device of claim 14, wherein and each of the plurality of service categories is classified according to one of the following: 1) destination IP address, 2) socket (destination IP address+port), 3) destination URL, 4) communication protocol, 5) content of data, 6) type of data service node, 7) type of access network and 8) type of service provided to a user.

17. The dedicated accounting device of claim 14, wherein the PDSN or IWF unit is configured to restrict the subscriber to use the wireless data service if the PDSN or IWF unit receives the balance exhaustion data from an Internet protocol accounting system (IPAS).

18. A computer-readable medium including a program containing computer-executable instructions for performing the method for billing a prepaid subscriber for a wireless data service usage in a mobile communication network, the method comprising:

receiving a billing initiation request signal from a wireless data service device, wherein the wireless data service device is either an interworking function (IWF) unit or a packet data serving node (PDSN);

responsive to the received billing initiation request signal, producing a usage-amount data for the subscriber based on the amount of data traffic that is duplicated and transferred through the wireless data service device, wherein the usage-amount data is configured to apply different data service charges to each of a plurality of service categories which are provided to the subscriber;

transferring, via a communication network the usage-amount data to a data service control point (DSCP);

receiving, via a communication network, balance exhaustion data from the DSCP, wherein the balance exhaustion data indicates that no balance for the prepaid subscriber remains;

transmitting, via a communication network, the balance exhaustion data to the wireless data service device, wherein the wireless data service device is configured to restrict the subscriber to use the wireless data service based on the balance exhaustion data, and wherein the wireless data service device is configured not to determine whether the balance has been exhausted; and responsive to a billing end request signal, received from the wireless data service device, transferring a billing request signal, indicative of a request to bill the subscriber for the usage-amount data, to an authentication, authorization and accounting (AAA) unit.

19. A method of billing a subscriber for a wireless data service usage in a mobile communication network, the method comprising:
- receiving, at a communication node, a call originating signal from a subscriber terminal;
- establishing, based on the call originating signal, a call connection with the subscriber terminal;
- providing a wireless data service to the subscriber terminal, wherein the subscriber has prepaid for at least a portion of the wireless data service; while the wireless data service is being provided, generating a usage-amount data for the subscriber based on the amount of data traffic that is duplicated and transferred through the communication node, wherein the usage-amount data is configured to apply different data service charges to each of a plurality of service categories which are provided to the subscriber;
- transferring, via a communication network the usage-amount data to a data service control point (DSCP);
- receiving, via a communication network, balance exhaustion data from the DSCP, wherein the balance exhaustion data indicates that no balance for the subscriber remains; and
- transmitting, via a communication network, the balance exhaustion data to a wireless data service device, wherein the wireless data service device is configured to restrict the subscriber to use the wireless data service based on the balance exhaustion data, and wherein the wireless data service device is configured not to determine whether the balance has been exhausted.

20. The method of claim 19, wherein and each of the plurality of service categories is classified according to one of the following: 1) destination IP address, 2) socket (destination IP address+port), 3) destination URL, 4) communication protocol, 5) content of data, 6) type of data service node, 7) type of access network and 8) type of service provided to a user.

21. The method of claim 19, wherein the wireless data service device is configured to restrict the subscriber to use the wireless data service if the wireless data service device receives the balance exhaustion data from an Internet protocol accounting system (IPAS).

* * * * *